March 3, 1970 G. L. KAGAN 3,499,106
COLOR SIGNAL PROCESSING CIRCUITS INCLUDING AN ARRAY OF GRID-PULSED, GROUNDED-CATHODE COLOR-DIFFERENCE AMPLIFIERS
Filed May 23, 1966
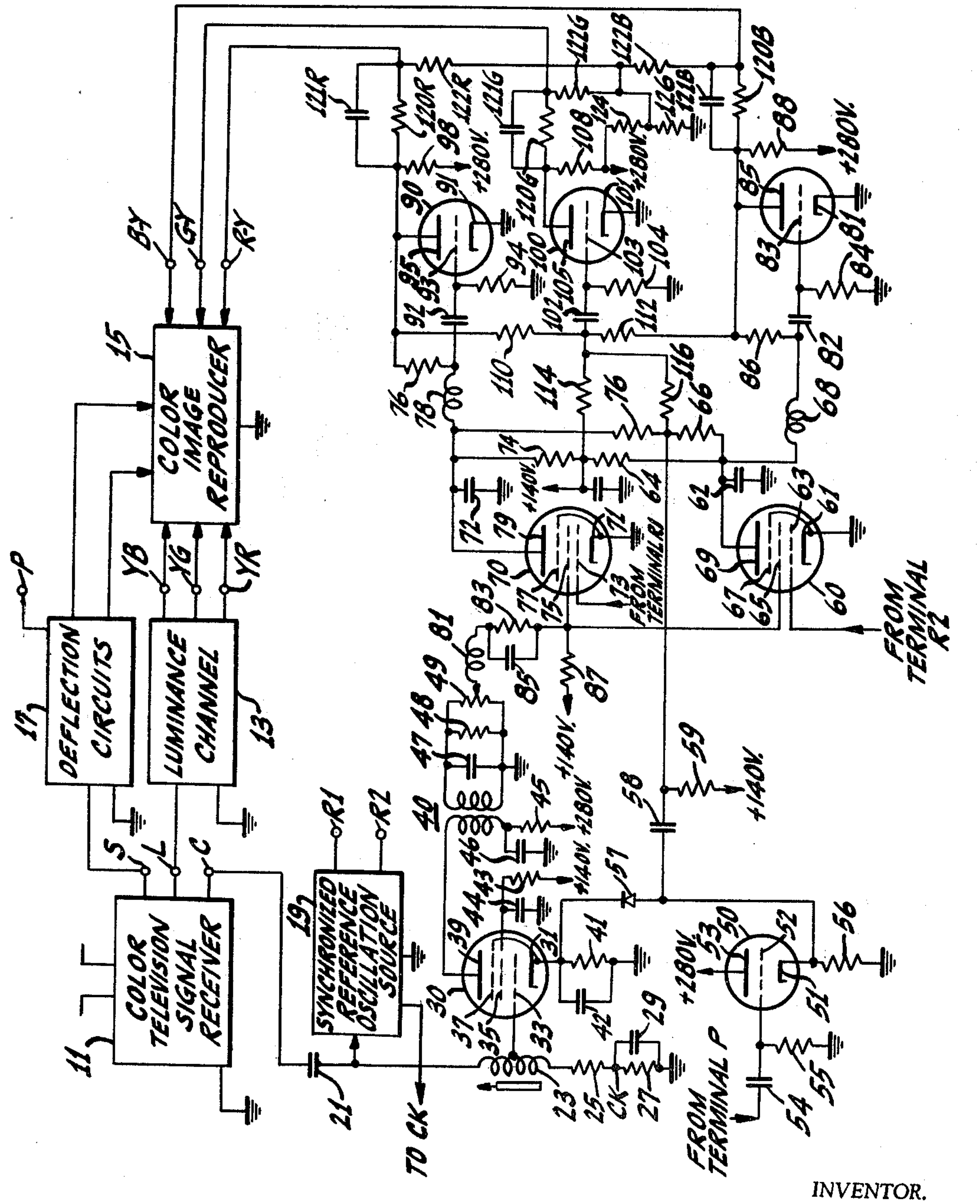
INVENTOR.
GERARD L. KAGAN
BY William H. Meagher
Attorney

United States Patent Office 3,499,106
Patented Mar. 3, 1970

3,499,106

COLOR SIGNAL PROCESSING CIRCUITS INCLUDING AN ARRAY OF GRID-PULSED, GROUNDED-CATHODE COLOR-DIFFERENCE AMPLIFIERS

Gerard Lester Kagan, Indianapolis, Ind., assignor to RCA Corporation, a corporation of Delaware Filed May 23, 1966, Ser. No. 574,839
Int. Cl. H04n 9/52
U.S. Cl. 178—5.4 8 Claims

ABSTRACT OF THE DISCLOSURE

A trio of matrix amplifier tubes are operated with grounded cathodes; respective demodulator outputs are applied to control grids of two of the matrix trio, while control grid of third receives combination of plate outputs of the two. Low impedance blanking pulse source (illustratively, a cathode follower pulse amplifier) supplies positive pulses to control grids for purpose of establishing stable bias; source also applies blanking pulse to cathode of chrominance amplifier for burst suppression purposes via coupling diode (serving isolation purpose during line intervals). Circuit arrangement permits matching bias establishment without introducing disturbing cross-coupling of color difference signals.

This invention relates generally to color television, and particularly to novel and improved circuitry useful in the processing of the chrominance component of a composite television signal, and in the derivation of color difference signal information therefrom for application to a color image reproducer.

In the RCA CTC10 color television receiver chassis, disclosed in detail in the RCA Color Television Service Data Pamphlet designated 1965 No. T–13, the color signal processing circuitry includes, inter alia: a bandpass amplifier stage selectively amplifying the chrominance component of a received signal; a pair of demodulator stages, responding to the bandpass amplifier ouput and to respectively different phases of a local color subcarrier frequency oscillation source in such manner as to develop, by synchronous detection techniques, a pair of color difference signal outputs; a trio of matrix amplifier stages, sharing a common cathode impedance, with the respective demodulator outputs being fed to the respective control grids of two of the matrix amplifier trio; and a blanker stage, responding to a positive flyback pulse input to develop at its cathode a positive blanking pulse for application to the bandpass amplifier cathode (precluding passage of the color synchronizing burst by the stage) and to develop in its anode circuit a negative blanking pulse output for common application to the matrix amplifier cathodes (for matrix amplifier bias stabilization purposes, as well as for kinescope blanking purposes).

The present invention is directed to modifications of the circuitry exemplified by the above-described CTC19 arrangement, whereby the same functions may be achieved simplifications in circuitry, reduction in cost of system components and increased ease of critical parameter control.

In accordance with an embodiment of the present invention the common cathode impedance of the matrix amplifier trio is eliminated, and each of the matrix tubes is operated with a grounded cathode. Two of the matrix amplifier tubes are utilized to amplify the respective demodulator outputs without interaction and to supply the respective outputs as two of the desired three color difference signals. The third of the desired color difference signals is obtained from the output of the third matrix amplifier tube, which responds to a combination of the plate outputs of the other two matrix amplifier tubes. The plate load of the blanker stage is eliminated, with the blanker thereby operating as a cathode follower stage only. The positive output pulse available at its cathode is commonly supplied to the control grids of the matrix amplifier trio in order to effect the previously mentioned bias stabilization and kinescope blanking purposes. Such positive pulse application is achieved via use of split anode loads for the respective demodulator tubes, together with matching "simulated demodulator" loads associated with the input of the third matrix tube. Effective pulse degeneration introduced at the third matrix tube by the output combination application is substantially matched by pulse degeneration introduced at the other matrix tubes through use of negative feeback paths.

The positive pulse output of the blanker stage is also used for application to the bandpass stage cathode for the previously mentioned burst suppression purposes; however, a diode coupling arrangement is used between the blanker and bandpass cathode circuits in order that the killing and unkilling (and/or gain control for ACC purposes) of the bandpass stage does not disturb the matrix tube biasing.

A primary object of the present invention is to provide novel and improved color signal processing circuitry useful in a color television receiver.

A particular object of the present invention is to provide novel and improved circuit arrangements for achieving matrixing, bias stabilization, kinescope blanking and burst suppression functions in a color television receiver.

Other objects and advantages of the present invention will be readily apparent to those skilled in the art after a reading of the following detailed description and an inspection of the accompanying drawing in which a color television receiver is illustrated, partially in simplified block form, but with pertinent segments of the receiver's color signal processing circuitry shown in schematic detail to illustrate a specific embodiment of the present invention.

Referring to the drawing, the initial stages of a color television receiver are shown only by a composite block 11 designated "color television signal receiver." These circuits may correspond, for example, to those employed in the abovementioned CTC19 receiver, and operate to derive from a received color television signal a plurality of outputs including: a wideband video signal output at terminal L, for application to the receiver's luminance channel 13; a deflection synchronizing pulse output at terminal S, for application to the receiver's deflection circuits 17; and a video signal at terminal C suitable for application (via capacitor 21) to the receiver's chrominance channel (to be subsequently described in detail), as well as for application to the reference oscillation source 19 for synchronization purposes.

The luminance channel 13 processes its video signal input in order to supply luminance signal information to the receiver's color image reproducer 15. Where the reproducer 15 utilizes a tri-gun shadow-mask color kinescope, as in the CTC19, separate luminance signal drives for the respective electron guns of the color kinescope are usually appropriate, whereby adjustment of their relative amplitudes may be effected for color balance purposes; such separate luminance signal drives are supplied to the reproducer 15 of the drawing from the respective output terminals YB, YG and YR of luminance channel 13. In order that the kinescope beams of the reproducer 15 may trace a raster at the kinescope screen, the reproducer conventionally incorporates a deflection yoke, requiring energization by respective line (horizontal) and field (vertical) frequency scanning waves; such waves are supplied by the deflection circuits 17. In the course of development and application of the horizontal scanning waves, a recurring train of positive-going flyback pulses are developed, and appear at output terminal P of the deflection circuits 17.

The synchronized reference oscillation source 19 serves to develop local oscillations, of color subcarrier frequency and bearing particular phase relationships to the reference phase represented by the color synchronizing burst component of the received signal. Utilizing circuitry such as is employed in the CTC19 receiver, the source 19 may suitably incorporate, for example, a crystal oscillator, subject to synchronization in response to the output of a gated burst amplifier stage; phase shifting circuitry associated with the oscillator output provides a pair of differently phased versions of the crystal oscillator output at the respective output terminals R1 and R2.

The receiver further includes circuitry for amplifying the chrominance component of the received signal and for deriving therefrom, through use of demodulation and matrixing functions, red, green and blue color difference signals for application to the respective kinescope guns of the reproducer 15. Since the present invention is particularly concerned with this segment of the color receiver, these circuits have been shown in schematic detail.

Capacitor 21 links the chrominance component supply terminal C to an end terminal of coil 23, which is tuned to resonance at the color subcarrier frequency in order to effect the selection of the chrominance component to the relative exclusion of lower video signal frequencies. The coil 23 is returned to a point of reference potential (e.g., chassis ground) via a pair of resistors 25 and 27 in series. A filter capacitor 29 shunts the resistor 27. Terminal CK, at the junction of resistors 25 and 27, provides a point for control voltage application (to be subsequently described).

A tapping point on coil 23 is directly connected to the control grid 33 of a tube 30, which serves as an amplifying device for the chrominance signal. A cathode resistor 41 is connected between the cathode 31 of the amplifier tube 30 and ground. A capacitor 42, in shunt with resistor 41, serves to bypass chrominance signal frequencies, but has sufficient impedance at the horizontal deflection frequency to permit pulsing of the cathode 31 in a manner to be subsequently described. The screen grid 35 of tube 30 is connected via a dropping resistor 43 to a B+ (+140 volt) terminal of the receiver's low voltage power supply (not illustrated). The screen grid 35 is bypassed to ground for chrominance signal frequencies by capacitor 44. The anode 39 of tube 30 is connected to a higher B+ (+280 volt) terminal of the power supply via the primary winding of bandpass transformer 40 in series with a dropping resistor 45. The junction of the winding and the dropping resistor is bypassed to ground by capacitor 46.

The above mentioned pulsing of cathode 31 is achieved by the coupling of positive-going horizontal blanking pulses (occurring during the recurring horizontal retrace intervals) from the cathode output of a blanker tube 50 via a diode 57. Blanker tube 50 is connected as a cathode follower stage, with its anode 53 directly connected to the 280 volt supply terminal. Positive-going flyback pulses from terminal P of deflection circuits 17 are applied to the control grid 52 of tube 50 via a capacitor 54; a grid leak resistor is connected from grid 52 to ground. Blanker tube 50 is rendered conducting during the retrace intervals by the applied flyback pulses, but grid current charging of capacitor 54 develops a bias that keeps tube 50 non-conducting during the intervening line intervals. The blanker tube output appears across a cathode load resistor 56.

The diode 57 is poled (with its anode connected to cathode 51 of tube 50) so as to conduct when the positive-going pulses appear across resistor 56. The diode conduction results in the development of a positive voltage pulse across the cathode impedance of tube 30, driving tube 30 off during the retrace intervals. The burst component of the input to tube 30 is thus not passed by tube 30. However, during the line intervals, when blanker tube 50 is nonconducting, chrominance amplifier tube 30 returns to an operative condition, and its cathode current passing through cathode resistor 31 develops a bias that renders diode 57 nonconducting during line intervals.

The nonconduction of diode 57 during line intervals serves to isolate the cathode follower 50 output from chrominance amplifier tube during these line intervals, a desirable function as will be subsequently explained.

The secondary of bandpass transformer is shunted by a capacitor 47, by a fixed resistor 48, and by the resistive element of a saturation control potentiometer. The chrominance signal component appears at a selectable level at the tap of potentiometer, and is applied therefrom via coil 81 in series with the parallel R-C bias network 83–85 to the respective screen grids (75 and 65) of demodulator tubes 70 and 60. A relatively large dropping resistor 87 is connected between the screen grids and the 140 volt supply terminal, providing the screen grids with a very low unidirectional operating potential. The suppressor grids (77 and 67) of the demodulator tubes are internally connected to the respective cathodes (71 and 61), which are directly connected to chassis ground. The respective control grids (73 and 63) receive differently phased outputs of the reference oscillation source 19 via respective terminals R1 and R2. The control grid drive circuitry (not schematically illustrated) preferably incorporate self-biasing arrangements, confining demodulator tube conduction to brief time intervals corresponding to the positive peaks of the respectively phased oscillations.

The color difference signal output of tube 70 is developed across a split anode load: resistor 74, shunted by the series combination of resistor 76 and resistor 59. A corresponding split anode load for tube 60 is provided by resistor 64, shunted by the series combination of resistor 66 and resistor 59. Capacitors 72 and 62 provide respective demodulator anode bypasses for frequencies in the chrominance band, and series chokes further aid in preventing passage of these input signal frequencies to the subsequent stages.

Coupling of the demodulator 70 output to its associated color difference amplifier tube 90 is achieved via a capacitor 92 coupled to the amplifier control grid 93. A grid leak resistor 94 is connected between grid 93 and the grounded cathode 91. The anode 95 is connected to the +280 volt supply by anode load resistor 98, and feedback resistor 96 establishes a negative feedback path between anode 95 and grid 93 via the capacitor 92.

The color difference amplifier tube 80 associated with the demodulator tube 60 has an exactly corresponding circuit arrangement involving capacitor 82, grid leak resistor 84, anode load resistor 88, and feedback resistor 86 in relation to its electrodes: cathode 81, control grid 83, and anode 85.

The third color difference amplifier tube 100 receives a combination of anode outputs from tubes 90 and 80 via respective matrixing resistors 110 and 112. The junction of the matrixing resistors is coupled via capacitor 102 to control grid 103. Grid leak resistor 104 connects grid 103 to the grounded cathode 101. Anode load resistor 108 connects anode 105 to the +280 volt supply. A split "simulated demodulator load" is provided in association with the grid circuit of tube 100, to match the grid circuitry of tubes 90 and 80. The split "load" comprises resistor 114, shunted by the series combination of resistors 116 and 59.

The anode output of tube 90 (illustratively, the red color difference signal) is fed to reproducer terminal $R-Y$ via the parallel R-C network 120R–121R. A resistor 122R connects terminal $R-Y$ to the junction of voltage divider resistors 124 and 126, connected in series between +280 volt supply and chassis ground.

The anode output of tube 100 (illustratively, the green color difference signal) is coupled with reproducer terminal $G-Y$ by a similar network arrangement involving parallel R-C network 120G–121G and resistor 122G.

In like manner, the anode output of tube 80 (illustratively, the blue color difference signal) is fed to reproducer terminal $B-Y$ per a corresponding circuit arrangement involving the parallel R-C network 120B–121B and resistor 122B.

It will be noted that in contrast with the previously mentioned CTC 19 matrix, no common cathode impedance is associated with tubes 80, 90 and 100; rather, the cathodes are all grounded. Matrixing to obtain the third $(G-Y)$ color difference signal is achieved via application of the outputs of tubes 80 and 90 in proper proportions to the input of tube 100; this is achieved without introducing significant interaction between tubes 80 and 90.

The split (real and "simulated") demodulator loads are provided in order to allow introduction of a grid current promoting pulse at each control grid (93, 103, and 83) to establish a stable line interval bias at these grids (by grid current charging of capacitors 92, 102 and 82), without introducing thereby any disturbing color difference signal cross-coupling. Resistor 59, shared by one branch of each demodulator load, is coupled by capacitor 58 to the cathode of pulse amplifier tube 50, and the positive-going (retrace interval) pulse output of the tube thus appears across the shared resistor. 59. This pulse output is conveyed via the respective resistors 76, 116, and 66 and the associated capacitors 92, 102, and 82 to the respective control grids 93, 103 and 83. With the impedance value of resistor 59 chosen to be small relative to the values of resistors 76, 116 and 66, resistor 59 introduces an insignificant degree of color-difference signal cross-coupling. Cross-coupling reduction is further enhanced by the additional voltage division effect obtained by use of the split load technique of pulse introduction.

With the operating points of tubes 80, 90 and 100 being established in response to pulsing from tube 50 (and these operating points, in turn, directly affecting reproducer biases, due to the D.C. coupling between matrix tubes and reproducer), the importance of the isolating function of diode 57 should now be recognized. During its line interval operation, chrominance amplifier tube 30 is subject to wide impedance variations; e.g., it may be killed or unkilled via control voltage application to terminal CK, from suitable color killer circuitry (as is associated with reference oscillation source of the CTC 19), or it may be subject to gain control for automatic chroma control purposes; Without the isolation provided by diode 57, such impedance variations could have a disturbing effect on the matrix tube bias development.

It also should be recognized that the circuit arrangement of the present invention preserves the achievement of a (horizontal) kinescope blanking function realized by the CTC19 pulsing circuitry; i.e., the driving of tubes 80, 90 and 100 into grid current during the horizontal retrace intervals develops negative-going pulses at the anodes 85, 95 and 105 which can conveniently effect reproducer blanking.

Parameter values suitable for use in circuit described above are set forth below.

| | | |
|---|---|---|
| Resistors: | | |
| R25 | ohms | 82 |
| R27 | megohms | 2.2 |
| R41 | ohms | 680 |
| R43 | do | 1,000 |
| R45 | do | 1,500 |
| R48 | do | 560 |
| R49 | do | 500 |
| R55 | do | 220K |
| R56 | do | 1,000 |
| R59 | do | 390 |
| R64 | do | 12K |
| R66 | do | 12K |
| R74 | do | 12K |
| R76 | do | 12K |
| R83 | do | 1,500 |
| R84 | megohms | 1 |
| R86 | ohms | 180K |
| R87 | do | 68K |
| R88 | do | 39K |
| R94 | do | 1M |
| R96 | do | 180K |
| R98 | do | 39K |
| R104 | do | 1M |
| R108 | do | 39K |
| R110 | do | 330K |
| R112 | do | 470K |
| R114 | do | 12K |
| R116 | do | 12K |
| R120R | do | 1M |
| R120B | do | 1M |
| R120G | do | 1M |
| R122R | do | 1M |
| R122B | do | 1M |
| R122G | do | 1M |
| R124 | do | 120K |
| R126 | do | 180K |
| Inductors: | | |
| L-68 | μh | 620 |
| L-78 | μh | 620 |
| L-81 | μh | 3.9 |
| Capacitors: | | |
| C21 | μμf | 15 |
| C29 | μf | .047 |
| C42 | μμf | 820 |
| C44 | μf | .01 |
| C46 | μμf | 1000 |
| C47 | μμf | 390 |
| C54 | μμf | 150 |
| C58 | μf | .47 |
| C62 | μμf | 33 |
| C72 | μμf | 33 |
| C82 | μf | .047 |
| C85 | μf | .027 |
| C92 | μf | .047 |
| C102 | μf | .047 |
| C121R | μf | .047 |
| C121B | μf | .047 |
| C121G | μf | .047 |

What is claimed is:

1. In a color television receiver including a source of signals comprising a chrominance component occupying recurring line intervals and a burst synchronizing component occupying interspersed retrace intervals, and demodulation means for deriving a pair of color difference a control grid, and an anode;

signals from a chrominance component input thereto, the combination comprising:

a trio of amplifying devices, each having a cathode, means for maintaining all of said cathodes at a substantially fixed potential;

means including respective capacitors for applying different ones of said pair of color difference signals to the respective control grids of two of said amplifying devices;

means including an additional capacitor for applying a combination of the color difference signal outputs appearing at the anodes of said two devices to the control grid of the third of said amplifying devices;

a low impedance source of positive-going pulses occurring during said retrace intervals; and respective resistive means of significantly higher impedance than said source impedance connecting said low impedance source to each of said capacitors for applying pulses from said pulse source to each of said control grids via the respectively associated capacitors so as to establish the respective operating points of said amplifying devices without introducing disturbing color difference signal cross-couplings.

2. Apparatus in accordance with claim 1 further including:

chrominance signal amplifying means coupled to said first-named source of signals for supplying the chrominance component input to said demodulation means; and means for disabling said chrominance signal amplifying means during said retrace intervals, said disabling means including means for establishing a coupling between said pulse source and said amplifying means during said retrace intervals and for disrupting said coupling during said line intervals when said amplifying means is operative.

3. Apparatus in accordance with claim 2 wherein said chrominance signal amplifying means comprises an amplifier tube having a cathode electrode, and a cathode circuit presenting a significant impedance at the frequency of said pulses, wherein said pulse source comprises a cathode follower pulse amplifying stage, and wherein said coupling establishing and disrupting means comprises a diode coupled between the output of said cathode follower stage and the cathode electrode of said chrominance signal amplifier tube.

4. Apparatus in accordance with claim 1 including means for establishing a negative feedback path between the anode and control grid of each of said two color difference signal amplifying devices, said negative feedback establishing means providing a degree of effective degeneration of the pulse applied to each of said two devices that substantially matches the degree of effective pulse degeneration introduced in the third color difference signal amplifying device by said output combination applying means.

5. In a color television receiver including a source of signals comprising a chrominance component occupying recurring line intervals and a burst synchronizing component occupying interspersed retrace intervals, the combination comprising:

pulse amplifying means, rendered conducting during said retrace intervals, for developing voltage pulses across an output load during said retrace intervals, said pulse amplifying means being nonconductive during said line intervals, a chrominance component amplifying device having input, output and common electrodes;

means for applying signals from said source to said input electrode of said chrominance component amplifying device;

an impedance coupled between the common electrode of said chrominance component amplifying device and a point of reference potential; and a diode connected between said common electrode and said output load, and poled so as to be rendered conducting during said retrace intervals by said voltage pulses, with the current so conducted by said diode passing through said impedance in such a direction and with sufficient amplitude to develop a disabling bias for said chrominance component amplifying device during said retrace intervals, and with the current passed by said chrominance component amplifying device through said impedance during said line intervals when said pulse amplifying means is nonconducting serving to bias said diode into non-conduction during said line intervals.

6. Apparatus in accordance with claim 5 also including an additional amplifying device, means for utilizing the voltage pulses across said output load to establish a bias on said additional amplifying device during said line intervals, and means for substantially altering the impedance presented by said chrominance component amplifying device during said line intervals through application of a control voltage to said input electrode, the nonconduction of said diode during said line intervals precluding impedance alterations of said chrominance component amplifying device from disturbing the bias on said additional amplifying device.

7. In a color television receiver including a source of signals comprising a chrominance component occupying recurring line intervals and a burst synchronizing component occupying interspersed retrace intervals, and demodulation means for deriving a pair of color difference signals from a chrominance component input thereto, the combination comprising:

a trio of amplifying devices, each having a cathode, a control grid, and an anode;

means for maintaining all of said cathodes at a fixed potential;

means for applying different ones of said pair of color difference signals to the respective control grids of two of said amplifying devices;

means for applying a combination of the color difference signal outputs appearing at the anodes of said two devices to the control grid of the third of said amplifying devices;

a low impedance source of positive-going pulses occurring during said retrace intervals, said source comprising a pulse amplifying stage connected as a cathode follower;

means for establishing the line interval biases for said trio of devices comprising respective means of significantly higher impedance than said source impedance for applying pulses from the cathode follower pulse amplifying stage to each of said control grids in a grid current promoting polarity;

a chrominance signal amplifying means coupled to said first-named source of signals for supplying the chrominance component input to said demodulation means, said chrominance signal amplifying means being subject to significant variation in impedance during said line intervals;

means including a diode for applying the output of said cathode follower pulse amplifying stage to said chrominance signal amplifying means in such a manner as to disable said chrominance signal amplifying means during said retrace intervals, and for isolating said bias establishing means from the impedance variations of said chrominance signal amplifying means during said line intervals.

8. Apparatus in accordance with claim 7 wherein said demodulation means includes a pair of demodulator tubes, and wherein said combination also includes a first pair of resistors, effectively in parallel, serving as a demodulator load for one of said demodulator tubes, one of said parallel resistors also serving as the impedance means for applying pulses to one of said two devices;

a second pair of resistors, effectively in parallel and substantially matching in impedance values said first pair, serving as a demodulator load for the other of said demodulator tubes, one of said second pair of resistors also serving as the impedance means for applying pulses to the other of said two devices;

and a third pair of resistors, effectively in parallel and substantially matching in impedance values said first pair, one of said third pair of resistors serving as the impedance means for applying pulses to said third device.

References Cited

UNITED STATES PATENTS

| | | | |
|---|---|---|---|
| 2,607,847 | 8/1952 | Heisig. | |
| 2,874,289 | 2/1959 | Massman | 328—133 |
| 2,901,534 | 8/1959 | Oakley | 178—5.4 |
| 2,917,575 | 12/1959 | Hever | 178—5.4 |
| 3,243,647 | 3/1966 | De Leers. | |
| 3,251,931 | 5/1966 | Jobe et al. | 178—5.4 |

ROBERT L. GRIFFIN, Primary Examiner

R. P. LANGE, Assistant Examiner